United States Patent
Holmquist

[11] 3,728,791
[45] Apr. 24, 1973

[54] BALE TWINE CUTTER
[76] Inventor: Wesley R. Holmquist, Rt. 5, Box 349 B, Idaho Falls, Idaho 83401
[22] Filed: Feb. 10, 1971
[21] Appl. No.: 114,269

[52] U.S. Cl. ................................................. 30/294
[51] Int. Cl. ............................................. B26b 3/00
[58] Field of Search ...................... 30/289, 290, 294, 30/314, 329, 278, 280, 317; 7/14.3; 294/26

[56] References Cited

UNITED STATES PATENTS

| 866,308 | 9/1907 | Sanders | 30/317 |
|---|---|---|---|
| 1,163,230 | 12/1915 | Gartland | 7/14.3 |
| 555,681 | 3/1896 | Dalton | 294/26 |

Primary Examiner—Robert C. Riordon
Attorney—Clarence A. O'Brien and Harvey B. Jacobson

[57] ABSTRACT

An implement particularly adapted for cutting bale twine comprising an elongated shank having a handle on one end thereof and a reversely opening hook on the second end thereof. A transverse blade is provided across the hook for a cutting of bale twine as the twine is guided thereagainst upon a movement of the hook over the top of a bale. The blade is laterally spaced from the hook with the hook looping rearwardly beyond the blade so as to self-cleaning in nature.

2 Claims, 4 Drawing Figures

Patented April 24, 1973
3,728,791
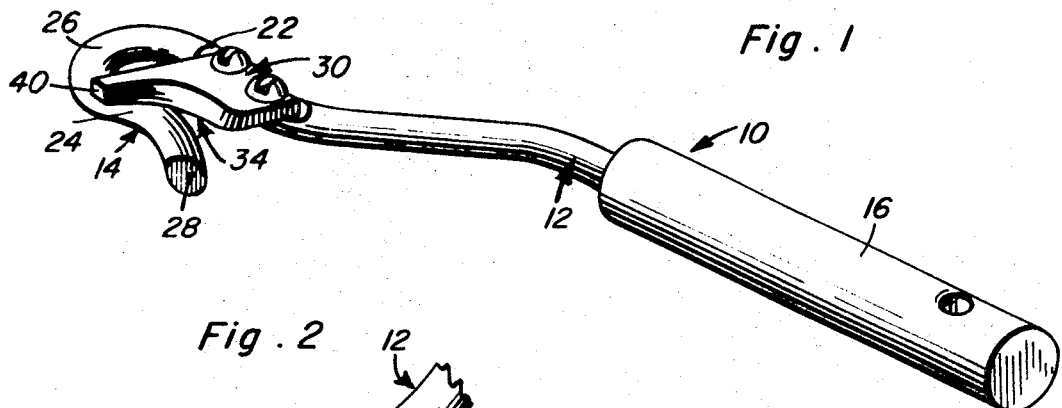
Fig. 1
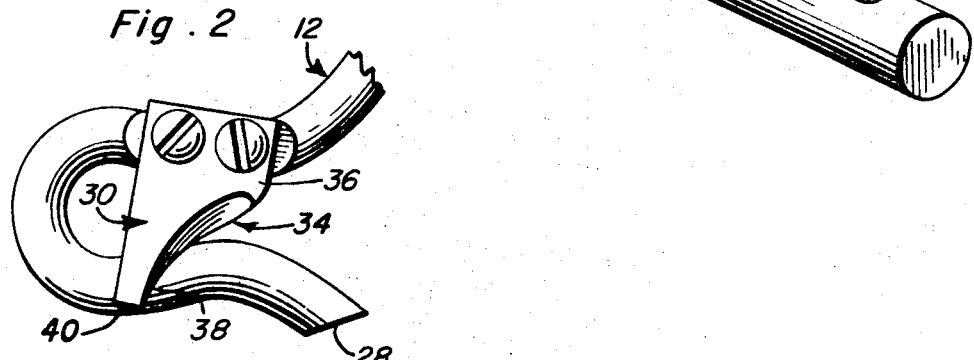
Fig. 2
Fig. 3
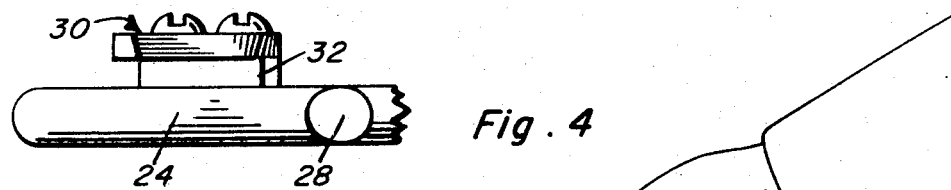
Fig. 4
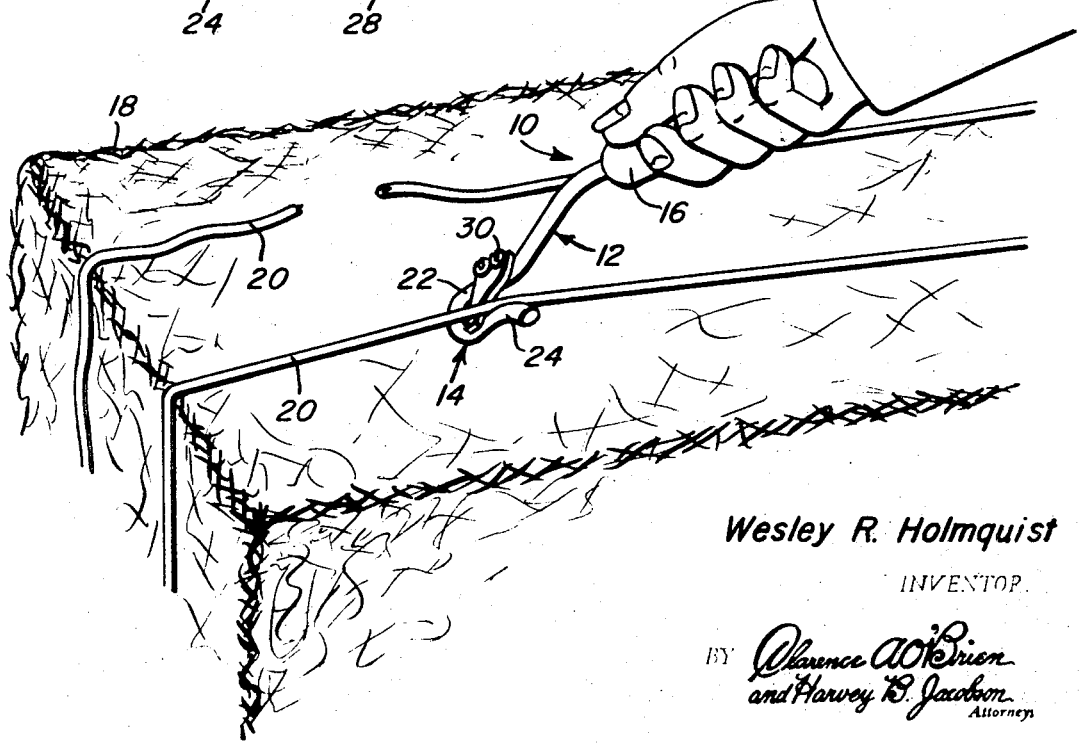
Wesley R. Holmquist
INVENTOR.
BY Clarence A. O'Brien
and Harvey B. Jacobson
Attorneys

BALE TWINE CUTTER

The present invention is concerned with a unique cutting implement particularly adapted for use in cutting bale twine.

More particularly, the instant invention relates to a bale twine cutter which is uniquely adapted to be grasped in one hand and quickly drawn across the top of a bale, the encountered twine, whether single or plural strings are involved, being effectively gathered and guided into the path of the cutting blade for an efficient severing thereof. The tool is self-cleaning in nature whereby the bale material, for example hay and the like, readily falls therefrom so as to avoid a clogging of the tool. By the same token, the tool is adapted to mount a handle of any desired length, longer handles being desired in those instances wherein the tool is to be used for reaching into hay mangers or elevated stacks.

Basically, the tool of the instant invention includes an elongated shank having a laterally offset hook defined on one end thereof and mounting a handle on the second end. The hook is rearwardly directed and has a flared mouth with the free end of the hook beveled so as to slide along a surface of a bale and easily engage beneath the encountered twine for a guiding of the twine into the hook. The severing of the twine is effected by a blade orientated transversely across the hook and presenting an arcuate sharpened edge which effects a slicing action on the twine.

These together with other objects and advantages which will become subsequently apparent reside in the details of construction and operation as more fully hereinafter described and claimed, reference being had to the accompanying drawings forming a part hereof, wherein like numerals refer to like parts through-out, and in which:

FIG. 1 is a perspective view of the twine cutter of the instant invention;

FIG. 2 is an enlarged view detailing the hook and twine cutting blade;

FIG. 3 is a side elevational view of the hook and blade structure of FIG. 2; and FIG. 4 is a perspective view illustrating one manner of using the bale twine cutter.

Referring now more specifically to the drawings, reference numeral 10 is used to generally designate the bale twine cutter comprising the instant invention. This cutter incorporates an elongated shank 12 integrally formed at one end into a reversely bent or rearwardly opening hook 14.

As will be appreciated from the drawings, the hook is laterally offset from the main portion of the shank 12 so as to open along a line in laterally spaced generally parallel relation to the shank. The second end of the shank mounts an elongated handle 16 with the hook 14, being offset therefrom, enabling the user to easily draw the hook directly along the surface of a bale 18 in a manner so as to smoothly ride under encountered twine 20. The handle 16, as previously indicated, can be of any desired length, depending upon the reach necessary so as to engage the bale twine 20 with the hook 14.

The hook 14 is formed of a first portion 22 constituting a generally linear continuation of the shank 12 and a second portion 24 in laterally spaced generally parallel relation to the first portion 22. The portions are interconnected by a forwardly directed loop 26. The outer or free end of the hook portion 24, which is rearwardly directed relative to the shank 12 so as to define a rearwardly opening hook, flares outwardly away from the shank, the shank at a laterally aligned portion also flaring or angling outward whereby an enlarged mouth is defined for facilitating entry of the twine 20 into the hook 14. Further, it will be noted that the extreme free end of the hook portion 24 is beveled or flattened as at 28 so as to, when vertically orientating the hook 14 with the hook portion 24 downwardly directed, smoothly slide across the surface of the bale 18 and easily move beneath the encountered twine 20.

The actual cutting of the twine is effected by a blade 30 bolted or otherwise rigidly affixed to the hook portion 22 and extending therefrom transversely across the hook and into overlying relation to the outer hook portion 24. The blade 30 is inwardly spaced relative to the loop or looped portion 26 and is laterally spaced from both hook portions 22 and 24 by means of a spacer block 32 interposed between the blade 30 and the blade mounting hook portion 22. In this manner, an unencumbered space is provided between the outer end of the blade and the underlying hook portion 24. This spacing, in conjunction with the open area provided between the hook loop 26 and the forward face of the blade cooperate to make the device self-cleaning in nature in that the hay or other baled material will readily fall out of the tool as the tool is drawn across the bale.

In order to effect the severing of the twine, the blade 30 is provided with a rearwardly directed arcuate or concave cutting edge 34 which, from a relatively blunt leading corner 36 adjacent the first hook portion 22, converges rearwardly toward the outer hook portion 24 and ultimately terminates in a portion 38 oriented almost perpendicularly to the hook portion 24 over which the section of the cutting edge 34 lies. The extreme outer end 40 of the blade is in general alignment with the outer periphery of the hook portion 24 and is blunted or flattened. Thus, it will be appreciated that the blade 30 is sharpened only in that area between the hook portion 22 and the outer periphery of the hook portion 24, thus in effect providing a guarded cutting edge 34. In this manner, it is highly unlikely that one using the device will accidentally cut himself.

The convex or arcuate configuration of the cutting edge 34 results in a drawing of the blade along the introduced twine so as to effect a slicing of the twine and a more efficient severing of the twine. Should the slicing action not complete the cutting of the twine, the terminal portion 38 of the cutting edge 34, which extends substantially perpendicular to the encountered twine, will easily complete the severing action.

From the foregoing, it will be appreciated that the use of the cutting tool of the instant invention requires only that the hook portion thereof be downwardly directed and drawn across the face of a tied bale. The leading free end of the hook portion 24 will encounter and direct the twine toward the cutting edge 34 of the blade 30 with continued movement of the tool resulting in a slicing and complete severing of the twine. The configuration of the hook ensures an encountering and inward guiding of the twine with the twine, once it has entered into the hook, being retained therein until severed. As will be readily appreciated, multiple twines on a bale will be sequentially encountered and severed, this action being suggested in FIG. 4. The orientation of the blade 30 transversely across the hook in forwardly spaced relation to the loop, defining in effect an open loop, and in laterally spaced relation to the outer hook portion 24 allows for a free passage of the bale material, for example hay, through the device as it moves across a bale, thus providing a self-cleaning implement. Incidentally, if so desired, the hook portion 24 can have the free end thereof extended so as to enlarge the formed hook whereby such can also function as a conventional bale hook for manipulation of bales as required.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A cutter for bale twine and the like comprising an elongated shank, handle means on one end of said shank, a twine guiding hook on the second end of said shank selectively receiving the twine therein upon movement of the hook over a twine tied bale, and a cutting blade positioned generally transversely across said hook for engaging and cutting hook received twine, said hook being reversely opening relative to said shank and including a first portion generally parallel to the handle means and a second generally parallel portion interconnected with said first portion by a loop, said second portion terminating in a free end, the free end section of the second hook portion flaring outwardly relative to the first hook portion to define an enlarged twine receiving mouth, said shank being bent outwardly relative to the flared section of the second hook portion between the first hook portion and the handle means to effect a lateral off-setting of said hook relative to said handle means, said blade being oriented between the opposed ends of said hook portions and in spaced relation to said loop to define a self-cleaning passage, said blade being secured to said first portion and overlying said second portion, said blade including a cutting edge directed toward the hook opening, said cutting edge being longitudinally arcuate and terminating in overlying relation to said second portion, said blade overlying said second hook portion in laterally spaced relation thereto to combine with the aforementioned cleaning passage in effecting a free movement of the bale material from the hook and blade.

2. The cutter of claim 1 wherein the extreme free end of said second hook portion is beveled to define a flat face slidable along a bale surface.

* * * * *